United States Patent
Chou et al.

(10) Patent No.: US 12,146,587 B2
(45) Date of Patent: Nov. 19, 2024

(54) FLOW CONTROL SWITCH

(71) Applicant: RAYZHER INDUSTRIAL CO., LTD, Hsinchu County (TW)

(72) Inventors: Ku-Hua Chou, Hsinchu County (TW); Yen-Cheng Chen, Hsinchu County (TW); Shih Wei Yu, Hsinchu County (TW)

(73) Assignee: RAYZHER INDUSTRIAL CO., LTD, Hsinchu County (TW)

( * ) Notice: Subject to any disclaimer, the term of this patent is extended or adjusted under 35 U.S.C. 154(b) by 62 days.

(21) Appl. No.: 18/325,125

(22) Filed: May 30, 2023

(65) Prior Publication Data
US 2023/0417342 A1 Dec. 28, 2023

(30) Foreign Application Priority Data
Jun. 24, 2022 (TW) .................................. 111123577

(51) Int. Cl.
*F16K 35/02* (2006.01)
*F16K 5/06* (2006.01)
*F16K 31/60* (2006.01)

(52) U.S. Cl.
CPC .......... *F16K 31/607* (2013.01); *F16K 5/0647* (2013.01)

(58) Field of Classification Search
CPC ............................ F16K 5/0647; F16K 35/027
USPC ......................................................... 251/96
See application file for complete search history.

(56) References Cited

U.S. PATENT DOCUMENTS

| 1,039,386 | A | * | 9/1912 | Grove | F16K 35/027 |
| | | | | | 251/96 |
| 1,089,098 | A | * | 3/1914 | Winkler | F16K 35/027 |
| | | | | | 251/96 |
| 2,101,356 | A | * | 12/1937 | Zak | F16K 5/10 |
| | | | | | 251/207 |
| 3,210,040 | A | * | 10/1965 | Thurlow | F16K 35/04 |
| | | | | | 192/69.7 |

(Continued)

FOREIGN PATENT DOCUMENTS

| CN | 105090579 B | 5/2017 |
| CN | 206246725 U | 6/2017 |

(Continued)

*Primary Examiner* — Kevin F Murphy
(74) *Attorney, Agent, or Firm* — Li & Cai Intellectual Property Office

(57) ABSTRACT

The present invention provides a flow control switch including a pipeline structure, a rotating structure, a position-limiting structure and a knob structure. The pipeline structure includes a tubular body and a ball body rotatably disposed in the tubular body. The rotating structure includes a rotatable element connected to the ball body for driving the ball body to rotate. The position-limiting structure is disposed on the tubular body. The knob structure is liftably disposed on the rotating structure for cooperating with the rotatable element. The position-limiting structure has a first and a second position-limiting groove. The knob structure includes a knob body liftably disposed on the rotatable element and a position-limiting element detachably disposed on the knob body. The position-limiting element is optionally disposed in one of the first and the second position-limiting groove, so as to limit a rotation of the rotatable element relative to the position-limiting structure.

10 Claims, 16 Drawing Sheets

(56) References Cited

U.S. PATENT DOCUMENTS

| | | | | |
|---|---|---|---|---|
| 5,490,660 | A | * | 2/1996 | Kamezawa ........... F16K 35/027 |
| | | | | 74/552 |
| 5,741,003 | A | * | 4/1998 | Segien, Jr. .............. F16K 31/60 |
| | | | | 74/25 |
| 6,276,662 | B1 | * | 8/2001 | Bugatti ................... F16K 35/00 |
| | | | | 251/95 |
| 9,915,358 | B2 | * | 3/2018 | Brushwood ............. F16K 35/04 |
| 10,480,542 | B2 | | 11/2019 | Bell et al. |
| 10,801,630 | B2 | | 10/2020 | Neber |

FOREIGN PATENT DOCUMENTS

| | | |
|---|---|---|
| CN | 212584304 U | 2/2021 |
| CN | 214999613 U | 12/2021 |
| JP | 6579944 B2 | 9/2019 |
| TW | I577910 B | 4/2017 |
| TW | M632441 U | 9/2022 |

\* cited by examiner

FLOW CONTROL SWITCH

CROSS-REFERENCE TO RELATED PATENT APPLICATION

This application claims the benefit of priority to Taiwan Patent Application No. 111123577, filed on Jun. 24, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a control switch, and more particularly to a flow control switch.

BACKGROUND OF THE DISCLOSURE

In the related art, the flow control switch can allow or prohibit gas (or liquid) from entering the system pipeline by adjusting the knob structure to an open state or a closed state, thereby adjusting or stopping the gas (or liquid) supply in the system pipeline. However, when the knob structure of the flow control switch is touched by an unexpected force and rotated to the closed state (or partially closed state), the gas or liquid supply in the system pipeline will be forced to stop, resulting in unnecessary damage or impact on back-end equipment or instruments.

SUMMARY OF THE DISCLOSURE

In response to the above-referenced technical inadequacy, the present disclosure provides a flow control switch. When the knob structure of the flow control switch is touched or hit by an unexpected force, the flow control switch can be used to limit the rotation of the rotatable member relative to the position-limiting structure through the position-limiting groove, so as to avoid the gas or liquid supply in the system pipeline being forced to stop, and prevent unnecessary damage or impact on the back-end equipment or instruments.

In order to solve the above-mentioned problems, one of the technical aspects adopted by the present disclosure is to provide a flow control switch, which includes a pipeline structure, a rotating structure, a position-limiting structure and a knob structure. The pipeline structure includes a tubular body and a ball body rotatably disposed in the tubular body. The rotating structure includes a rotatable element connected to the ball body for driving the ball body to rotate relative to the tubular body. The position-limiting structure is disposed on the tubular body to surround the rotatable element. The knob structure is liftably disposed on the rotating structure for cooperating with the rotatable element. The position-limiting structure has a first position-limiting groove, a second position-limiting groove adjacent to the first position-limiting groove, and a third position-limiting groove adjacent to the second position-limiting groove and corresponding to the first position-limiting groove. The knob structure includes a knob body liftably disposed on the rotatable element and a position-limiting element detachably disposed on the knob body, and the position-limiting element of the knob structure is optionally disposed in one of the first position-limiting groove, the second position-limiting groove and the third position-limiting groove, so as to limit a rotation of the rotatable element relative to the position-limiting structure.

In order to solve the above-mentioned problems, another one of the technical aspects adopted by the present disclosure is to provide a flow control switch, which includes a pipeline structure, a rotating structure, a position-limiting structure and a knob structure. The pipeline structure includes a tubular body and a ball body rotatably disposed in the tubular body. The rotating structure includes a rotatable element connected to the ball body for driving the ball body to rotate relative to the tubular body. The position-limiting structure is disposed on the tubular body to surround the rotatable element. The knob structure is liftably disposed on the rotating structure for cooperating with the rotatable element. The position-limiting structure has a first position-limiting groove, and a second position-limiting groove adjacent to the first position-limiting groove. The knob structure includes a knob body liftably disposed on the rotatable element and a position-limiting element detachably disposed on the knob body, and the position-limiting element of the knob structure is optionally disposed in one of the first position-limiting groove and the second position-limiting groove, so as to limit a rotation of the rotatable element relative to the position-limiting structure.

Therefore, in the flow control switch provided by the present disclosure, by virtue of "the position-limiting structure being disposed on the tubular body to surround the rotatable element," "the position-limiting structure having a first position-limiting groove, a second position-limiting groove adjacent to the first position-limiting groove, and a third position-limiting groove adjacent to the second position-limiting groove and corresponding to the first position-limiting groove" and "the position-limiting element of the knob structure being optionally disposed in one of the first position-limiting groove, the second position-limiting groove and the third position-limiting groove," a rotation of the rotatable element can be limited relative to the position-limiting structure.

Furthermore, in the flow control switch provided by the present disclosure, by virtue of "the position-limiting structure being disposed on the tubular body to surround the rotatable element," "the position-limiting structure having a first position-limiting groove and a second position-limiting groove adjacent to the first position-limiting groove" and "the position-limiting element of the knob structure being optionally disposed in one of the first position-limiting groove and the second position-limiting groove," a rotation of the rotatable element can be limited relative to the position-limiting structure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
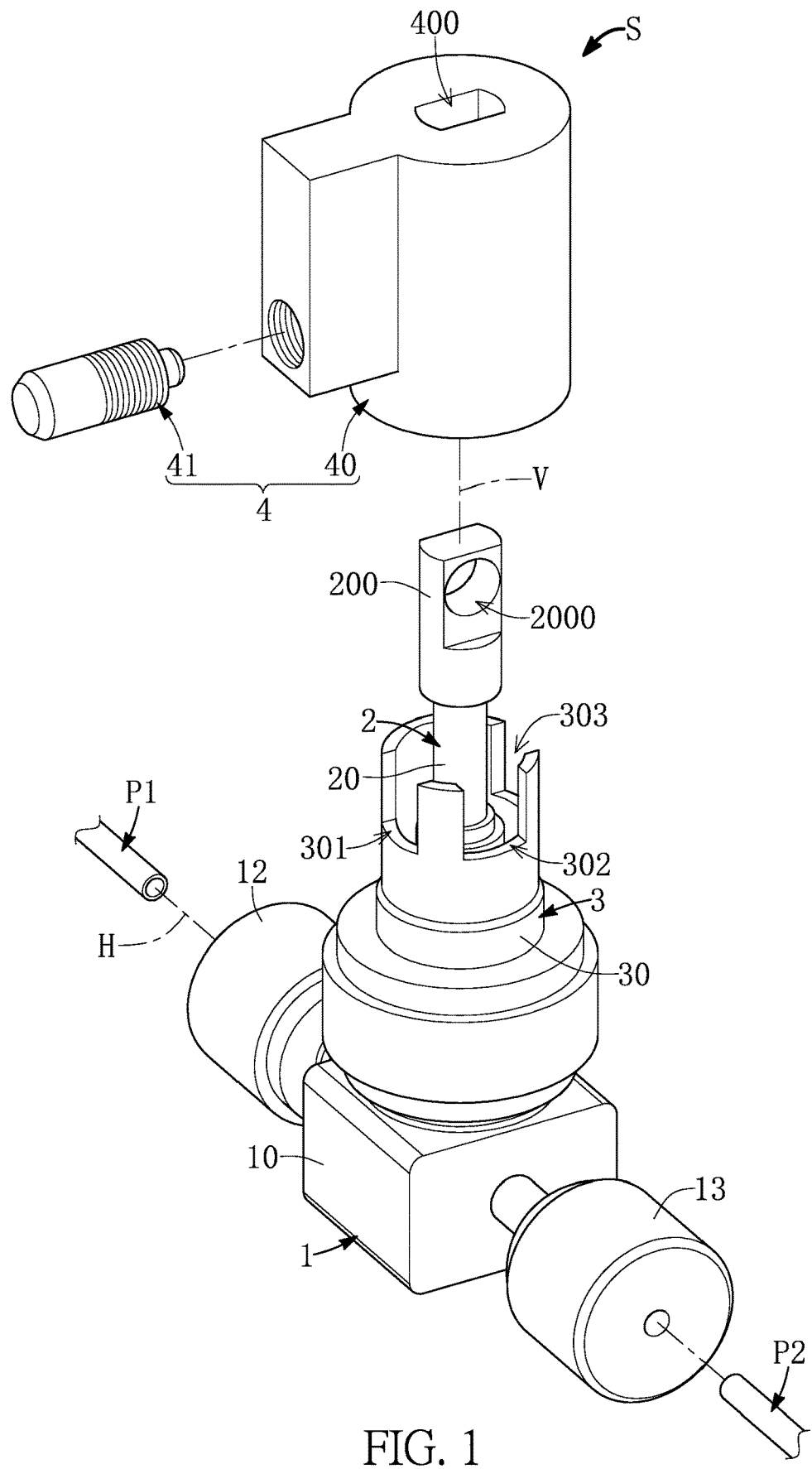
FIG. 1 is a schematic exploded view of a flow control switch according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 15, a first embodiment of the present disclosure provides a flow control switch S (or a flow control device), which includes a pipeline structure 1, a rotating structure 2, a position-limiting structure 3 and a knob structure 4. The flow control switch S can be a gas control valve, a liquid control valve or other types of control switches. However, the aforementioned details are disclosed for exemplary purposes only, and are not meant to limit the scope of the present disclosure.

More particularly, referring to FIG. 1 to FIG. 4, the pipeline structure 1 includes a tubular body 10 and a ball body 11 (or sphere) rotatably disposed in the tubular body 10. For example, the tubular body 10 may have a straight channel or a channel of any shape. When the tubular body 10 has a straight channel, the tubular body 10 of the pipeline structure 1 has a horizontal axis line H in an extending direction of the tubular body 10. Moreover, the pipeline structure 1 includes an inlet pipeline matching element 12 (such as an inlet pipeline fitting) disposed at an end of the tubular body 10, and the inlet pipeline matching element 12 can be configured to connect to an inlet pipeline P1 (i.e., to insert and fix one end of the inlet pipeline P1 into the inlet pipeline matching element 12). In addition, the pipeline structure 1 includes an outlet pipeline matching element 13 (such as an outlet pipeline fitting) disposed at another end of the tubular body 10, and the outlet pipeline matching element 13 can be configured to connect to an outlet pipeline P2 (i.e., to insert and fix one end of the outlet pipeline P2 into the outlet pipeline matching element 13). However, the aforementioned details are disclosed for exemplary purposes only, and are not meant to limit the scope of the present disclosure.

More particularly, referring to FIG. 1 to FIG. 4, the rotating structure 2 includes a rotatable element 20 connected to the ball body 11 for driving the ball body 11 to rotate relative to the tubular body 10.

For example, referring to FIG. 1 to FIG. 4, the rotatable element 20 of the rotating structure 2 has a vertical axis line V in an extending direction of the rotatable element 20, and the rotatable element 20 can rotate at a predetermined angle relative to the vertical axis line V. Furthermore, the rotatable element 20 has a first rotatable portion 20A, a second rotatable portion 20B and a third rotatable portion 20C, and the first rotatable portion 20A, the second rotatable portion 20B and the third rotatable portion 20C can be combined into an integrated structure. Moreover, the first rotatable portion 20A is connected to the ball body 11, the second rotatable portion 20B cooperates with a knob body 40, and the third rotatable portion 20C is connected between the first rotatable portion and the second rotatable portion 20B. In addition, the rotatable element 20 has a surrounding space 2001 disposed around the third rotatable portion 20C and between the first rotatable portion 20A and the second rotatable portion 20B. However, the aforementioned details are disclosed for exemplary purposes only, and are not meant to limit the scope of the present disclosure.

More particularly, referring to FIG. 1 to FIG. 4, the position-limiting structure 3 is disposed on the tubular body 10 to surround the rotatable element and the position-limiting structure 3 has a first position-limiting groove 301, a second position-limiting groove 302 adjacent to the first position-limiting groove 301, and a third position-limiting groove 303 adjacent to the second position-limiting groove 302 and corresponding to the first position-limiting groove 301.

For example, referring to FIG. 1 to FIG. 4, a first angle between "a first direction (such as a first direction line) from a middle position of the first position-limiting groove 301 toward the vertical axis line V" and "a second direction (such as a second direction line) from a middle position of the second position-limiting groove 302 toward the vertical axis line V" can be 90 degrees or close to 90 degrees (that is to say, the first position-limiting groove 301 and the second position-limiting groove 302 can be arranged in an arrangement of about 90 degrees from the orientation of the top view). Furthermore, a second angle between "the second direction from the middle position of the second position-limiting groove 302 toward the vertical axis line V" and "a third direction (such as a third direction line) from a middle position of the third position-limiting groove 303 toward the vertical axis line V" can be 90 degrees or close to 90 degrees (that is to say, the second position-limiting groove 302 and the third position-limiting groove 303 can be arranged in an arrangement of about 90 degrees from the orientation of the top view). Moreover, a third angle between "the first direction from the middle position of the first position-limiting groove 301 toward the vertical axis line V" and "the third direction from the middle position of the third position-limiting groove 303 toward the vertical axis line V" can be 180 degrees or close to 180 degrees (that is to say, the first position-limiting groove 301 and the third position-limiting groove 303 can be arranged in an arrangement of about 180 degrees from the orientation of the top view). In addition, the second direction from the middle position of the second position-limiting groove 302 toward the vertical axis line V is parallel to the horizontal axis line H of the tubular body 10. It should be noted that the position-limiting structure 3 includes a surrounding body 30 detachably disposed on the tubular body 10 to surround the rotatable element 20, and the first position-limiting groove 301, the second position-limiting groove 302 and the third position-limiting groove 303 downward extend from a top side of the surrounding body and are perpendicular to the tubular body 10. However, the aforementioned details are disclosed for exemplary purposes only, and are not meant to limit the scope of the present disclosure.

More particularly, referring to FIG. 1 to FIG. 4, the knob structure 4 can be liftably (upward or downward) disposed on the rotating structure 2 for cooperating with the rotatable element 20. In addition, the knob structure 4 includes a knob body 40 liftably (upward or downward) disposed on the rotatable element 20 and a position-limiting element 41 detachably disposed on the knob body 40, and the position-limiting element 41 of the knob structure 4 can be optionally disposed in one of the first position-limiting groove 301, the second position-limiting groove 302 and the third position-limiting groove 303, so as to limit a rotation of the rotatable element 20 relative to the position-limiting structure 3.

For example, referring to FIG. 1 to FIG. 4, the position-limiting element 41 can be fixed on the knob body 40 by screwing, and the knob body 40 can be configured to drive the position-limiting element 41 to move in the surrounding space 2001 of the rotatable element 20. Furthermore, the knob body 40 has a matching opening 400 formed on a top side thereof, the rotatable element 20 has a matching protrusion 200 disposed on a top side thereof for cooperating with the matching opening 400 of the knob body 40, and the matching protrusion 200 has a through opening 2000. However, the aforementioned details are disclosed for exemplary purposes only, and are not meant to limit the scope of the present disclosure.

Figure 2:
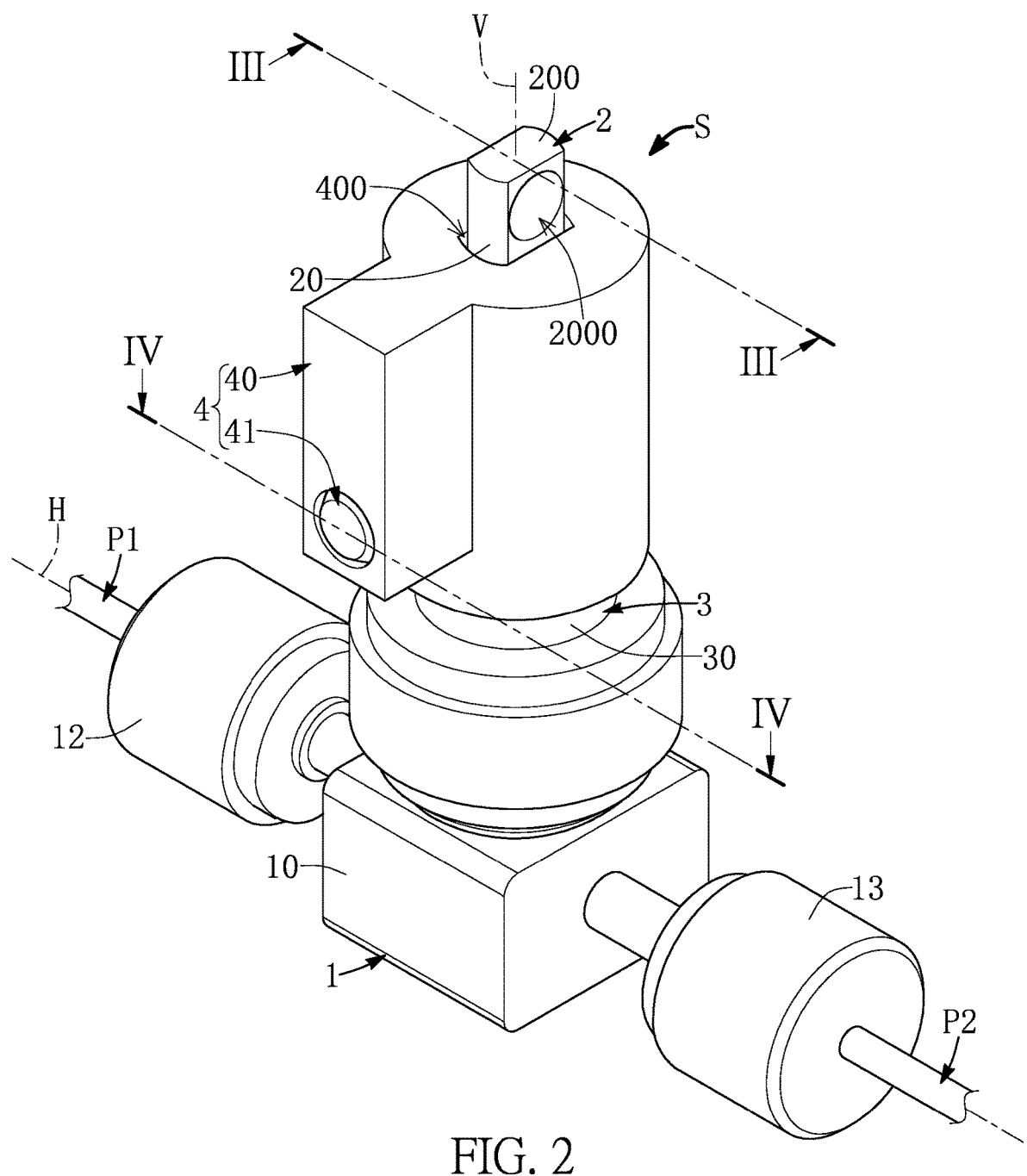
FIG. 2 is a schematic assembled view of the flow control switch in a first state according to the first embodiment of the present disclosure (when the flow control switch is in a first closed state and the knob body is moved downward to a bottommost position)
Figure 3:
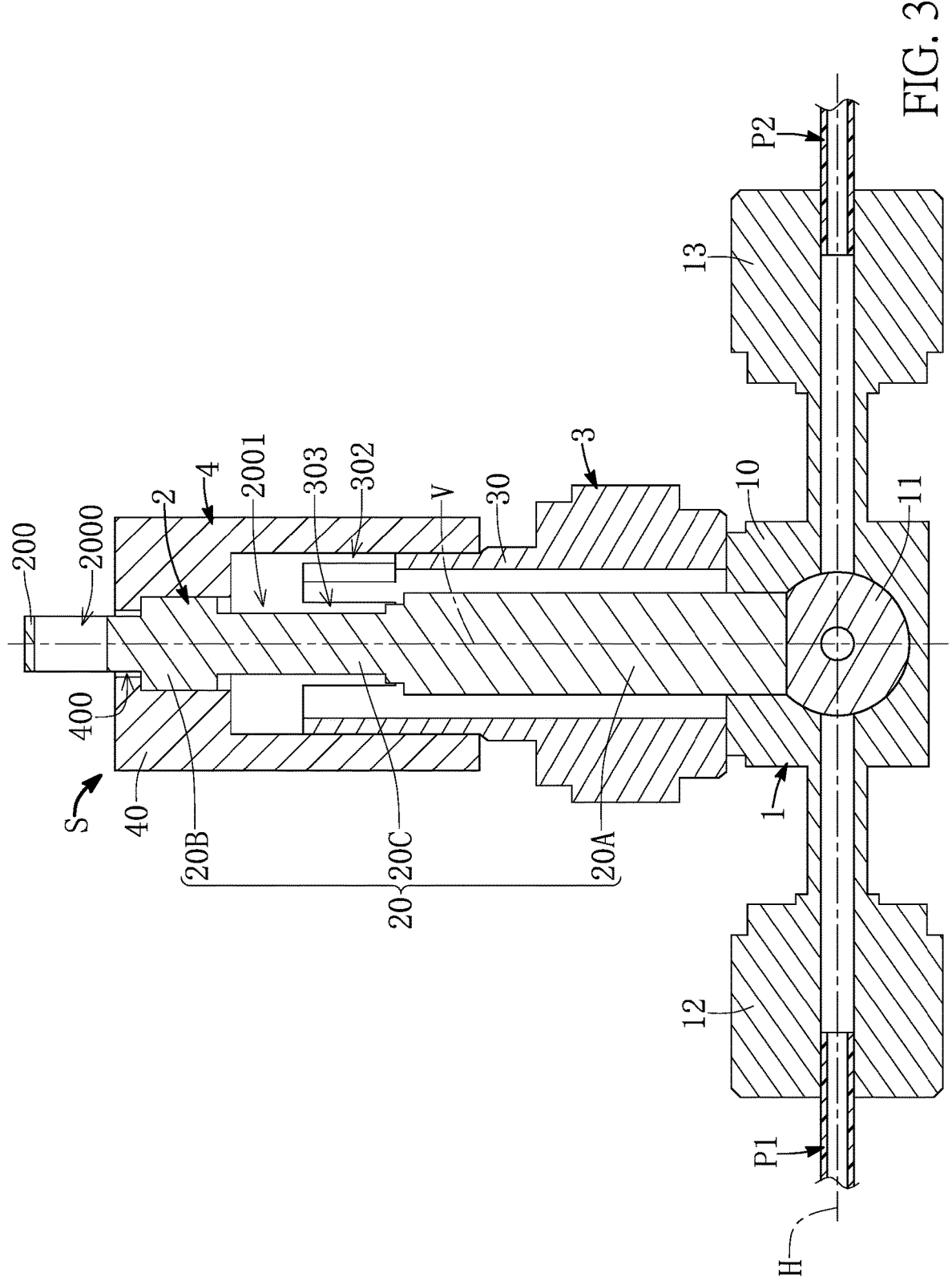
FIG. 3 is a schematic cross-sectional view taken along line III-III of FIG. 2.
Figure 4:
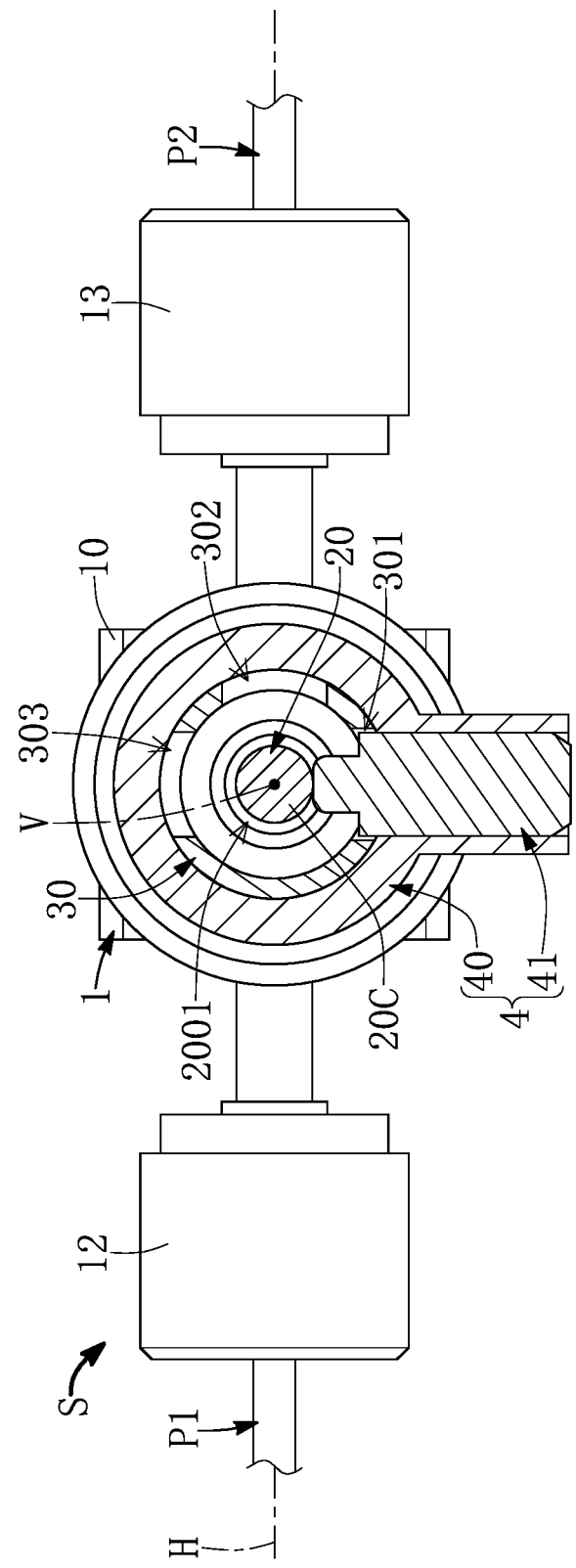
FIG. 4 is a schematic cross-sectional view taken along line IV-IV of FIG. 2.
Figure 11:
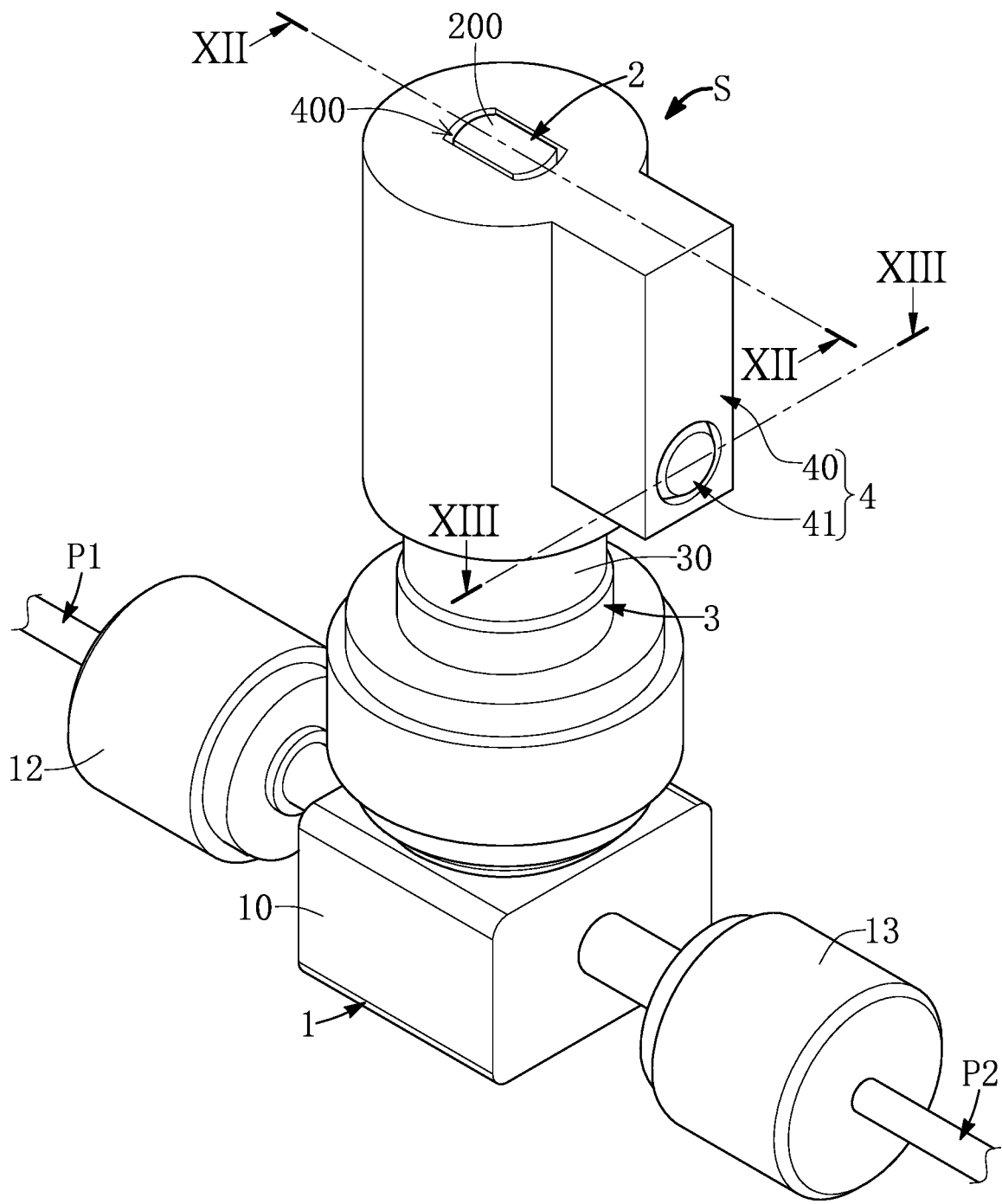
FIG. 11 is a schematic assembled view of the flow control switch in a second state according to the first embodiment of the present disclosure (when the flow control switch is in the open state and the knob body is moved downward to a bottommost position)
Figure 12:
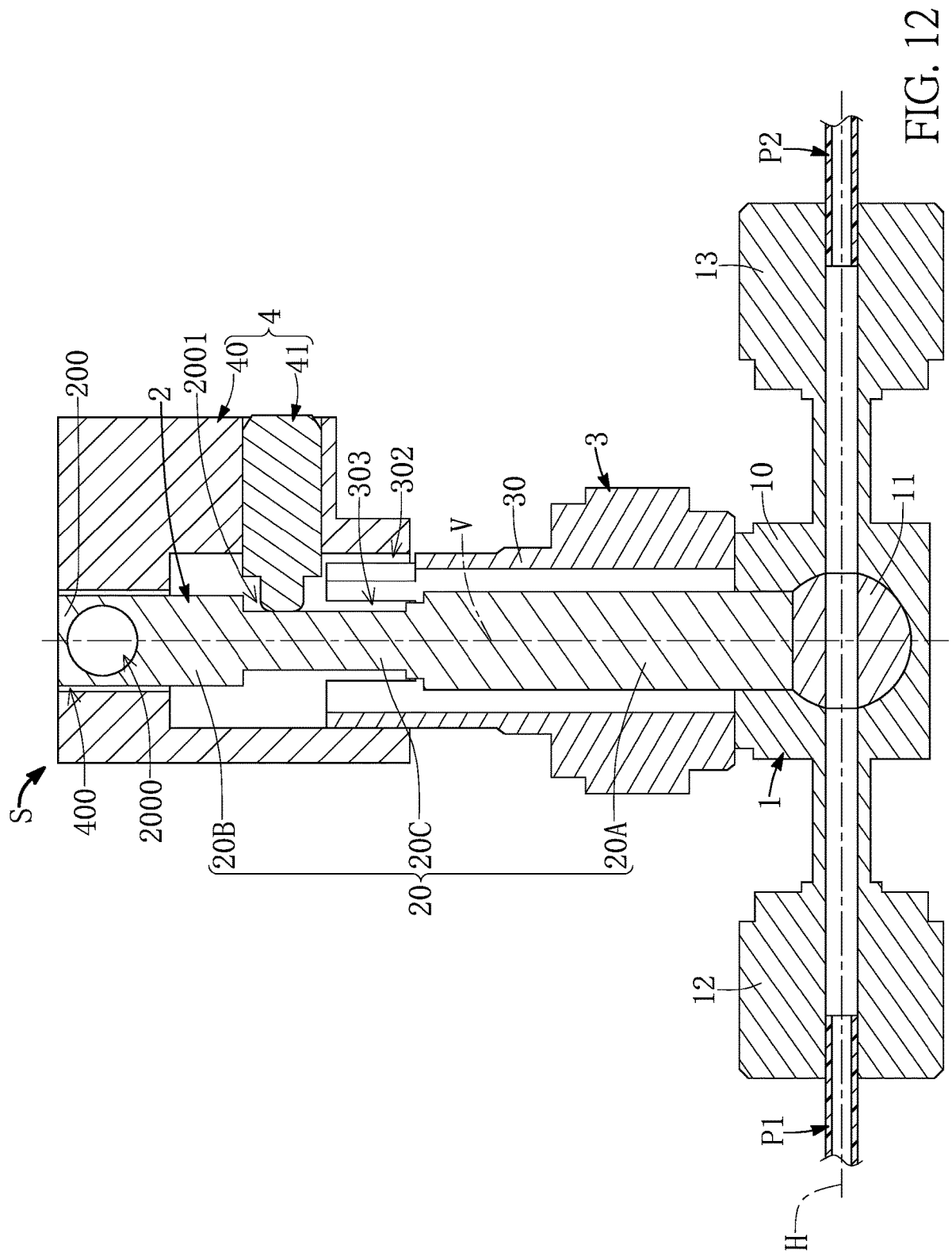
FIG. 12 is a schematic cross-sectional view taken along line XII-XII of FIG. 11.
Figure 13:
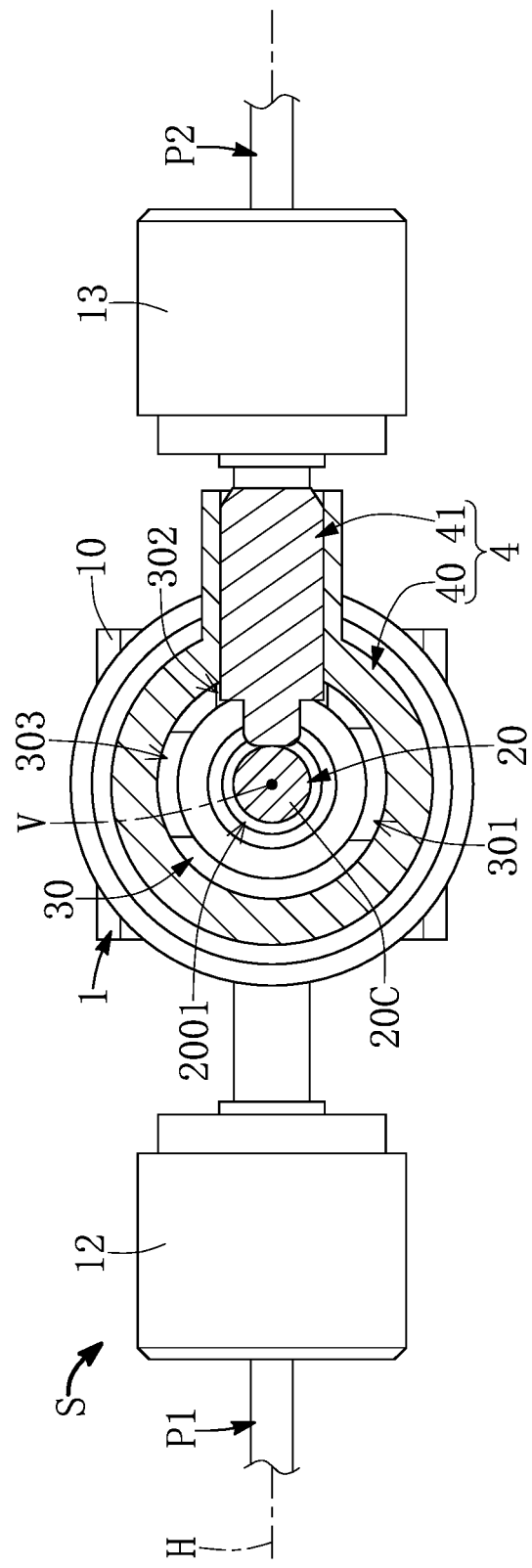
FIG. 13 is a schematic cross-sectional view taken along line XIII-XIII of FIG. 11.
Figure 14:
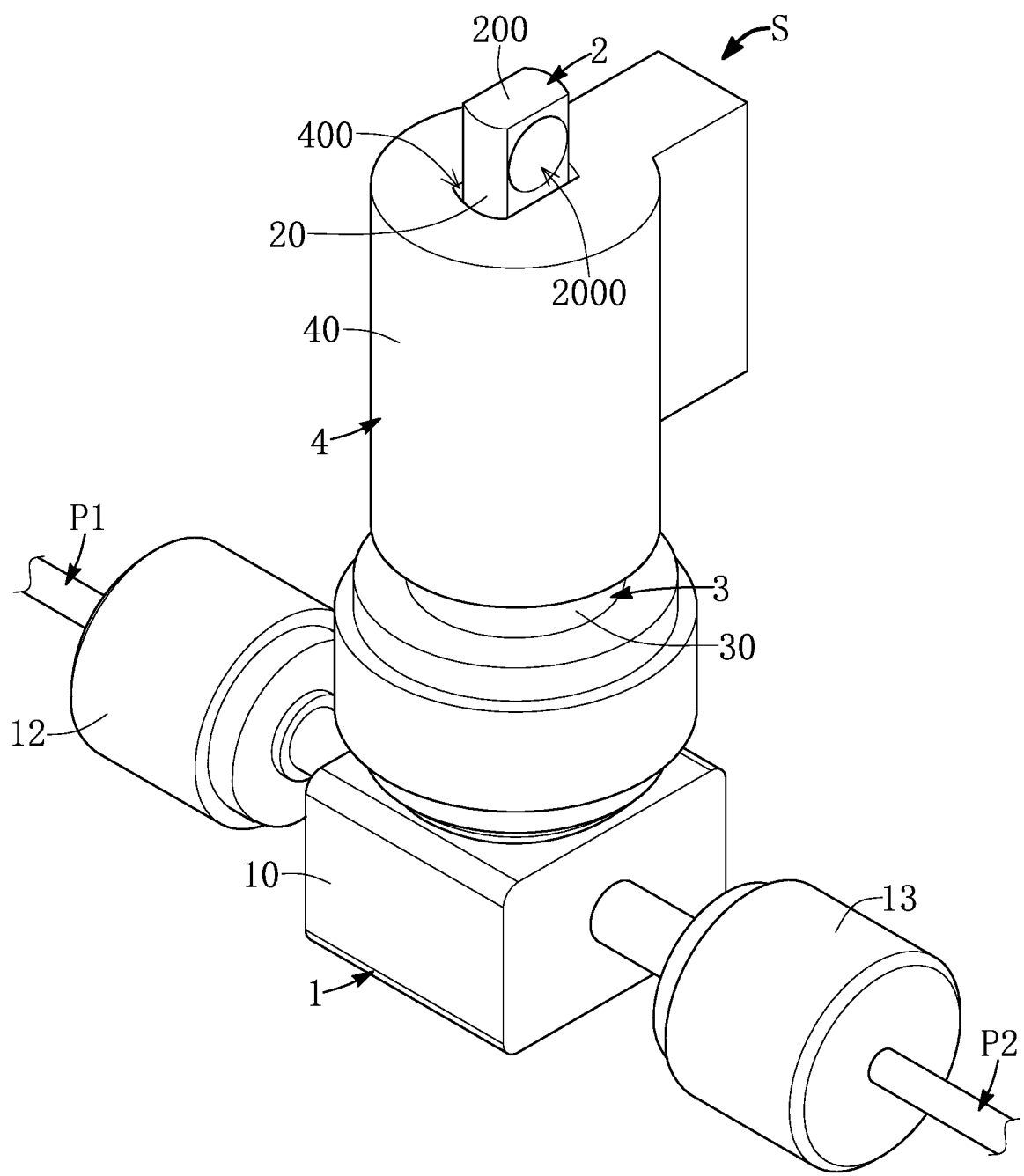
FIG. 14 is a schematic assembled view of the flow control switch in a first state according to the first embodiment of the present disclosure (when the flow control switch is in a second closed state and the knob body is moved downward to a bottommost position)

More particularly, referring to FIG. 2 to FIG. 4, FIG. 11 to FIG. 13, and FIG. 14, FIG. 2 is a schematic assembled view of the flow control switch in a first state according to the first embodiment of the present disclosure (when the flow control switch is in a first closed state and the knob body is moved downward to a bottommost position), FIG. 11 is a schematic assembled view of the flow control switch in a second state according to the first embodiment of the present disclosure (when the flow control switch is in the open state and the knob body is moved downward to a bottommost position), and FIG. 14 is a schematic assembled view of the flow control switch in a first state according to the first embodiment of the present disclosure (when the flow control switch is in a second closed state and the knob body is moved downward to a bottommost position). When the knob body 40 is configured to drive the position-limiting element 41 to move downward to enter one of the first position-limiting groove 301 (as shown in FIG. 2 to FIG. 4), the second position-limiting groove 302 (as shown in FIG. 11 to FIG. 13) and the third position-limiting groove 303 (as shown in FIG. 14), the knob body 40 is moved downward to a bottommost position, so that the matching protrusion 200 of the rotatable element 20 is exposed outside the matching opening 400 of the knob body 40 (as shown in FIG. 2, FIG. 11 and FIG. 14).

Figure 5:
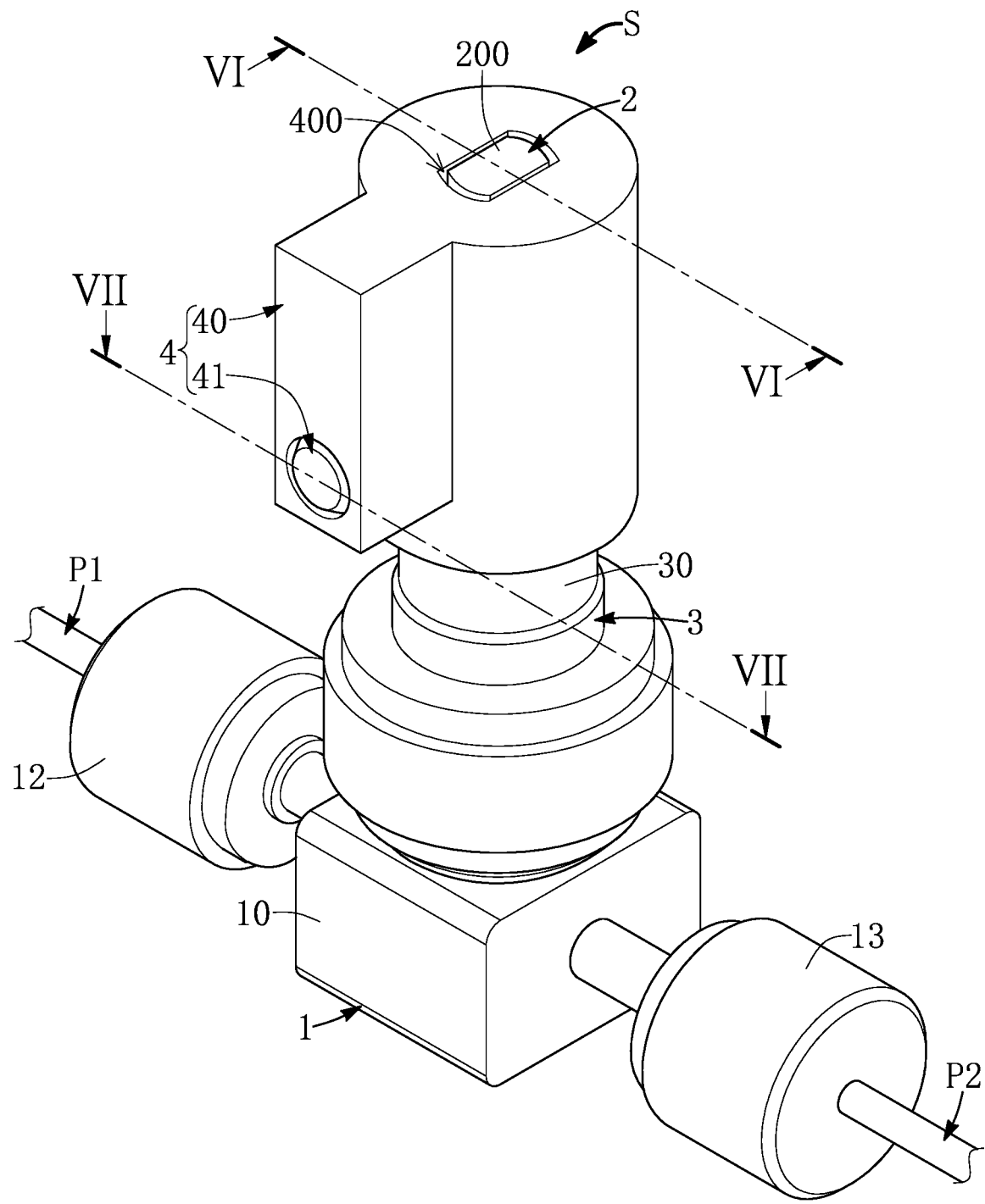
FIG. 5 is a schematic assembled view of the flow control switch in a second state according to the first embodiment of the present disclosure (when the flow control switch is in the first closed state and the knob body is moved upward to a topmost position)
Figure 6:
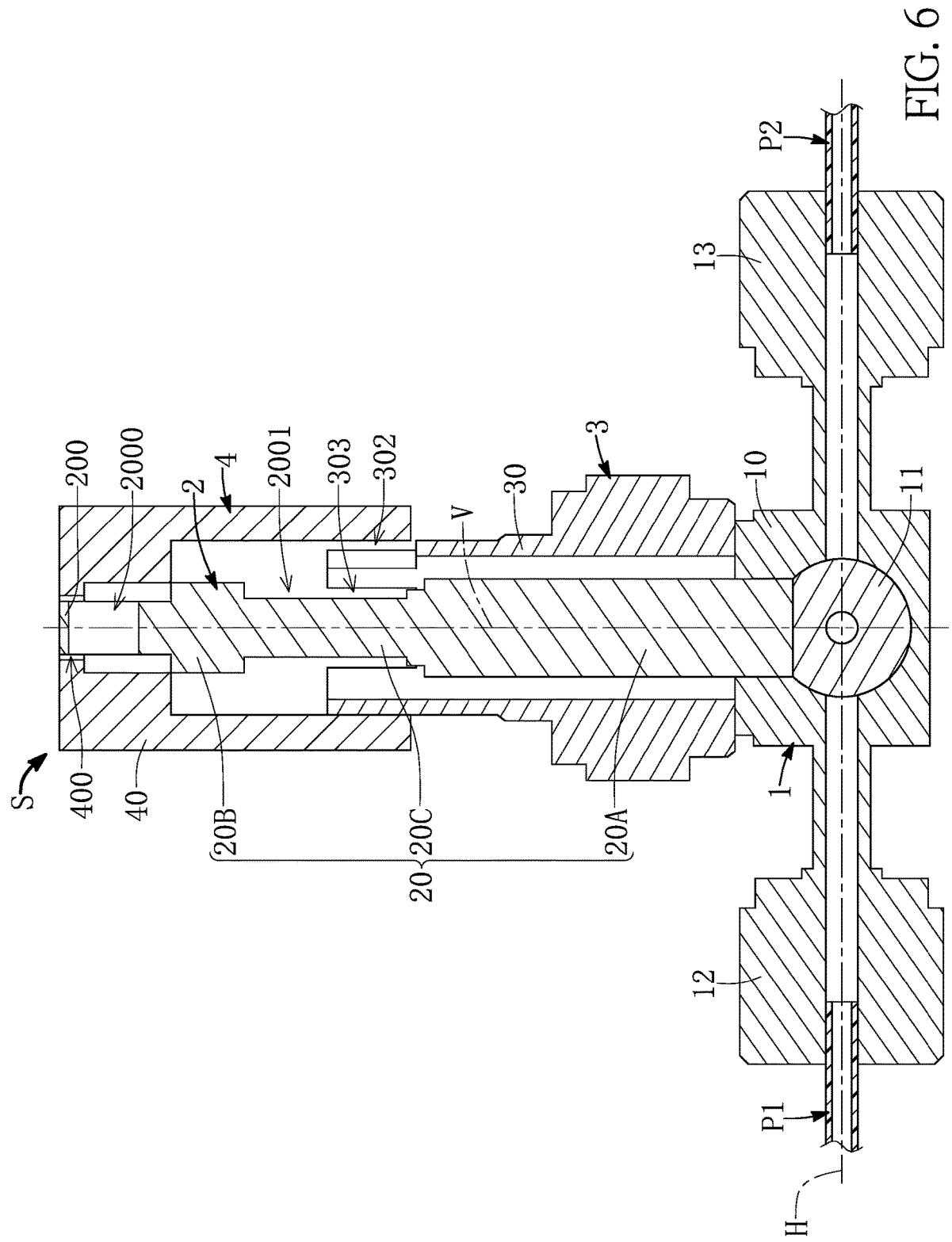
FIG. 6 is a schematic cross-sectional view taken along line VI-VI of FIG. 5.
Figure 7:
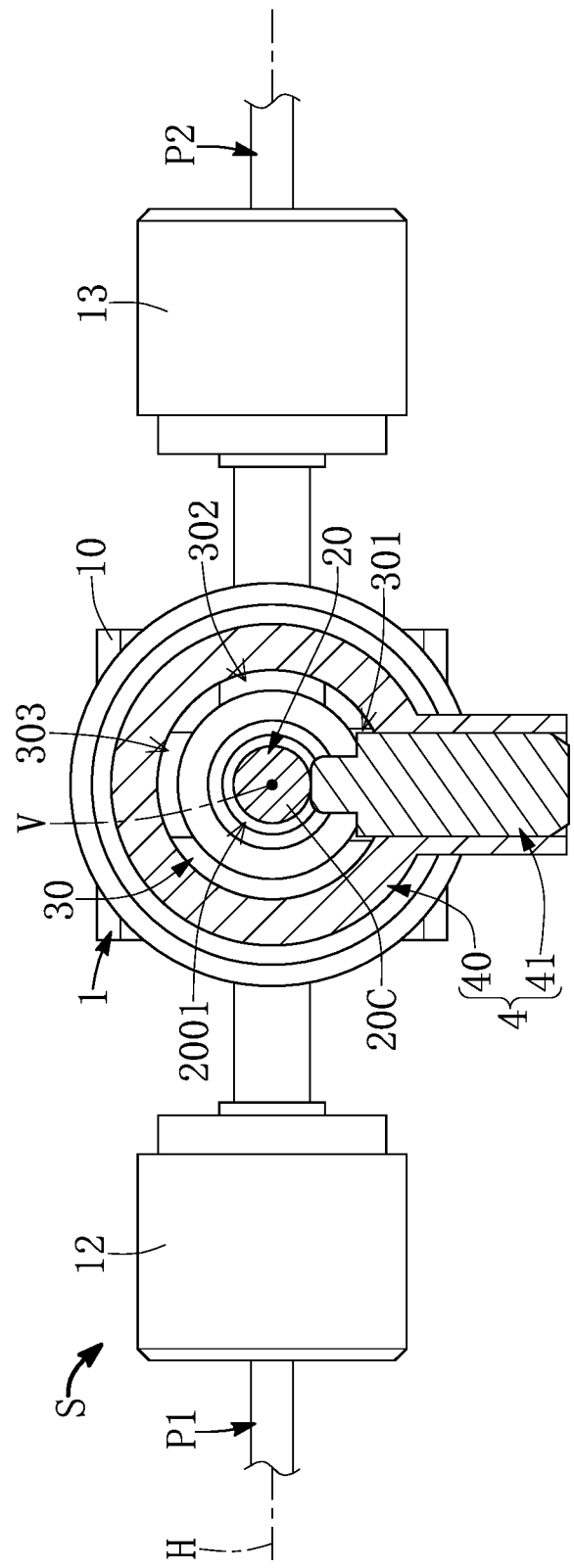
FIG. 7 is a schematic cross-sectional view taken along line VII-VII of FIG. 5.
Figure 8:
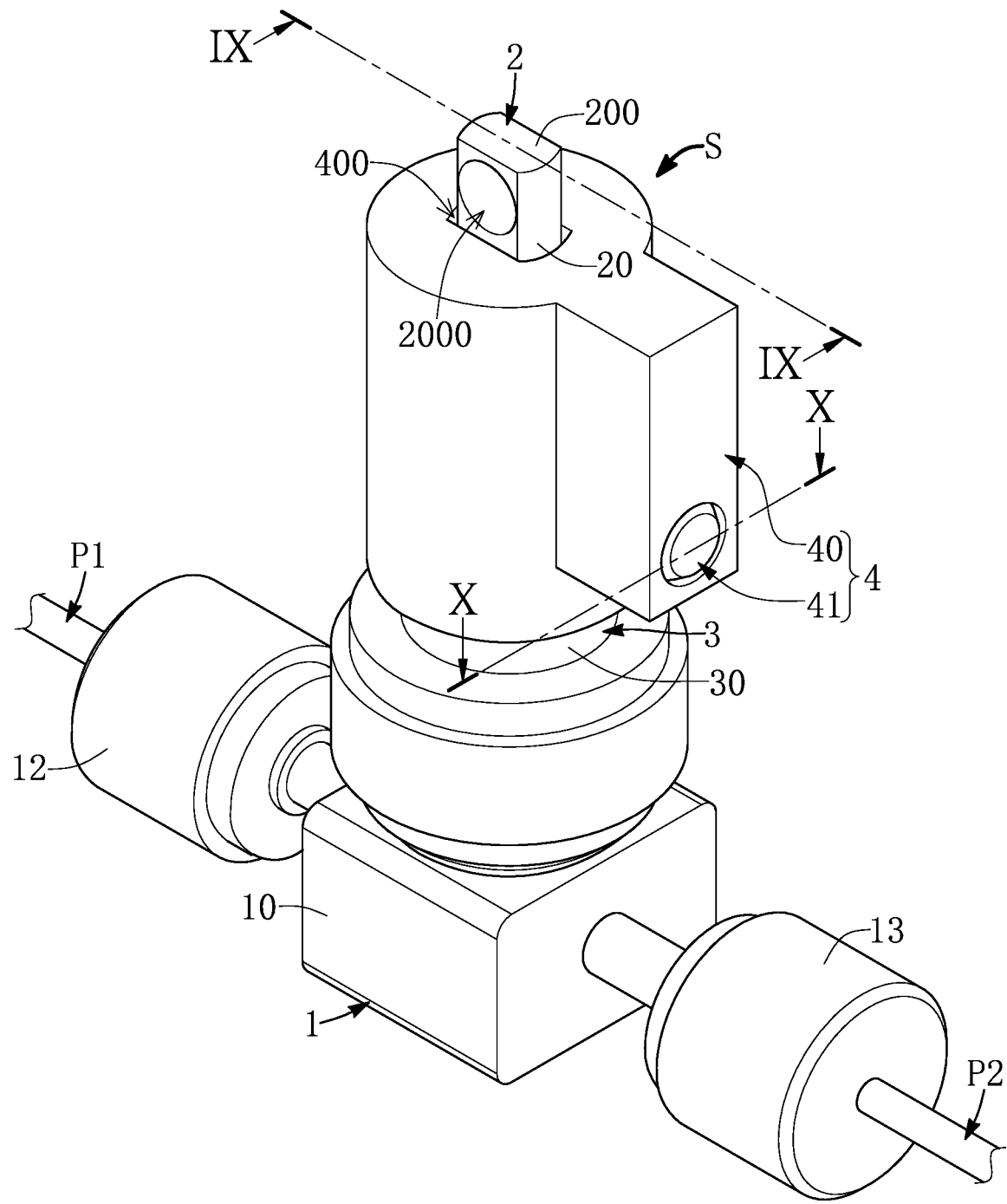
FIG. 8 is a schematic assembled view of the flow control switch in a first state according to the first embodiment of the present disclosure (when the flow control switch is in an open state and the knob body is moved upward to a topmost position)
Figure 9:
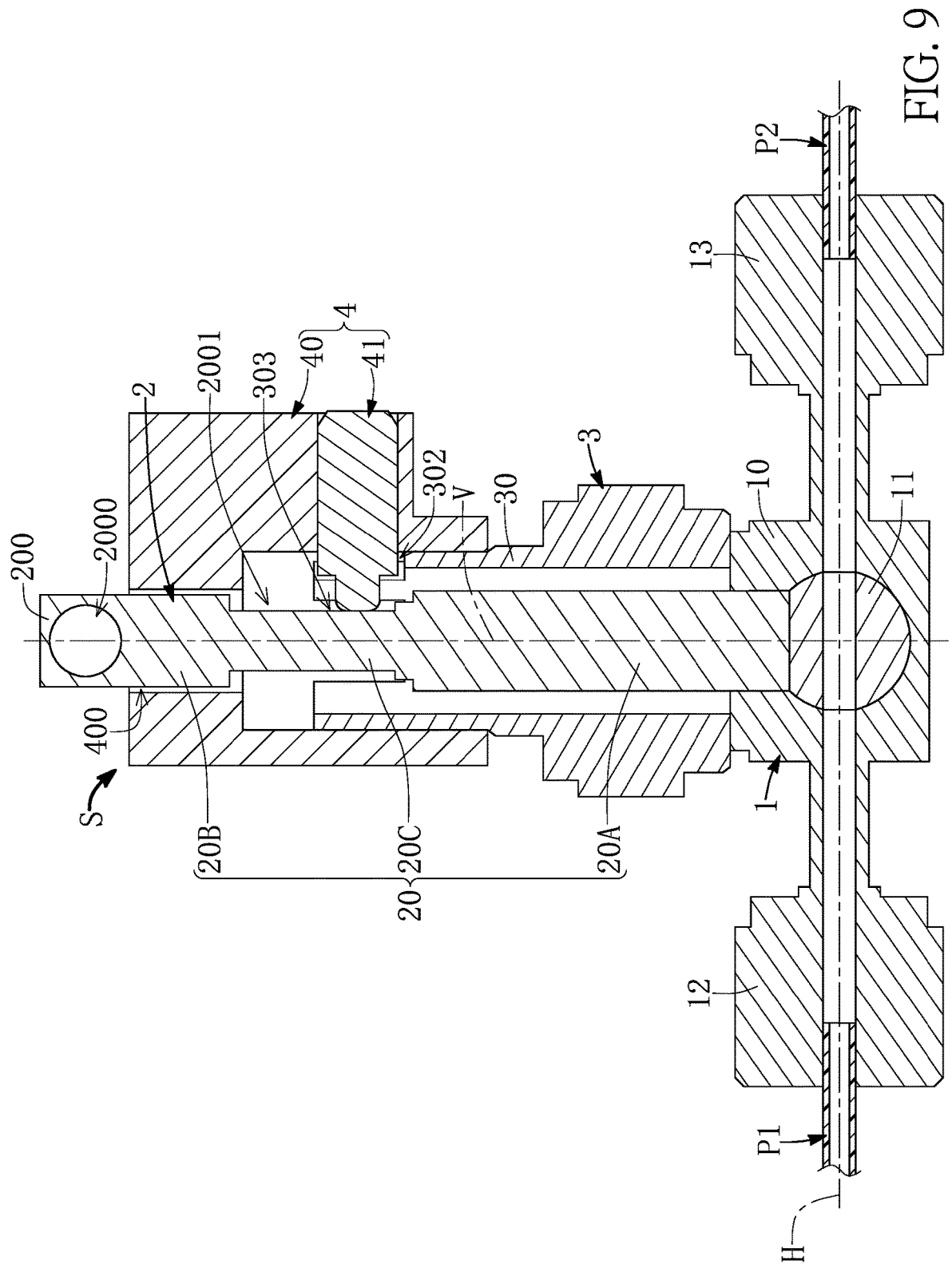
FIG. 9 is a schematic cross-sectional view taken along line IX-IX of FIG. 8.
Figure 10:
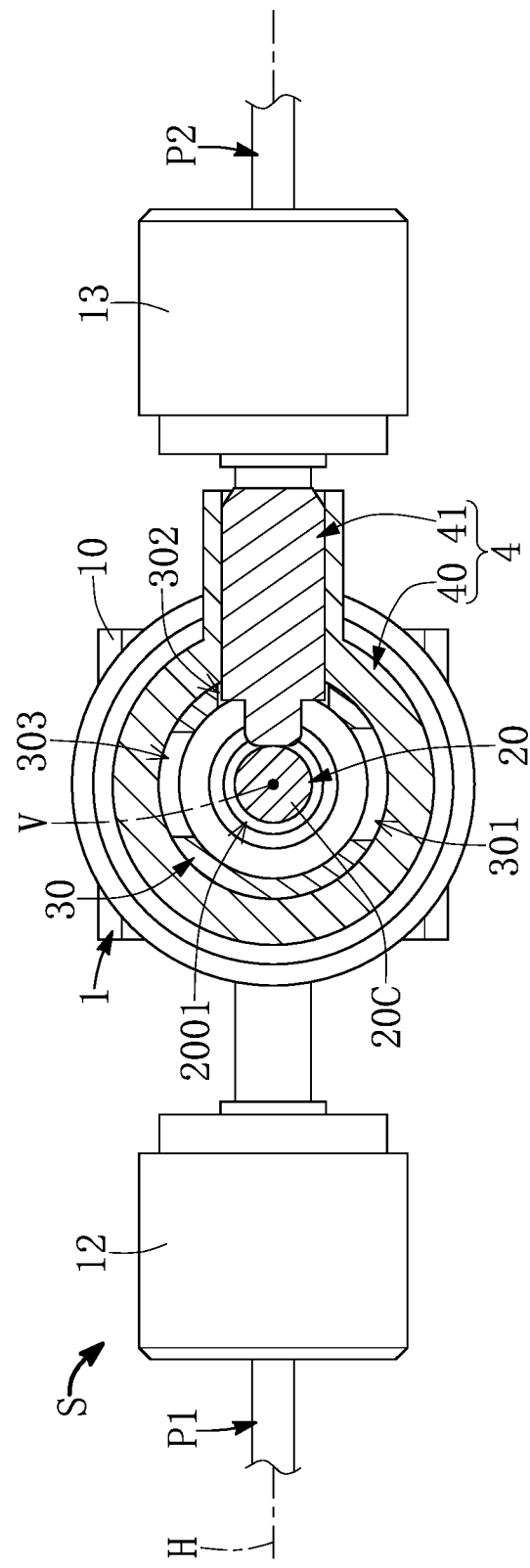
FIG. 10 is a schematic cross-sectional view taken along line X-X of FIG. 8.
Figure 15:
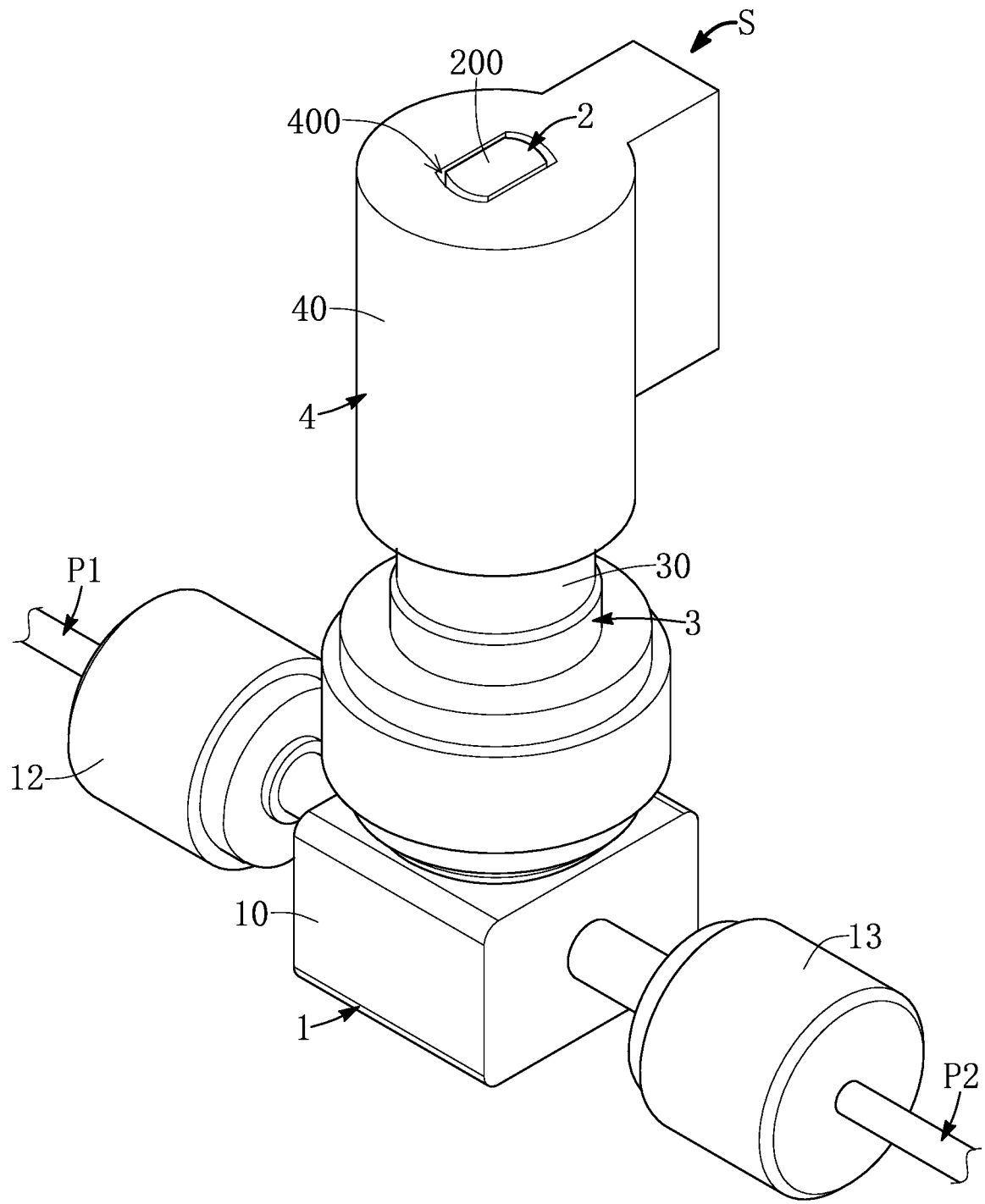
FIG. 15 is a schematic assembled view of the flow control switch in a second state according to the first embodiment of the present disclosure (when the flow control switch is in the second closed state and the knob body is moved upward to a topmost position)

More particularly, referring to FIG. 5 to FIG. 7, FIG. 8 to FIG. 10, and FIG. 15, FIG. 5 is a schematic assembled view of the flow control switch in a second state according to the first embodiment of the present disclosure (when the flow control switch is in the first closed state and the knob body is moved upward to a topmost position), FIG. 8 is a schematic assembled view of the flow control switch in a first state according to the first embodiment of the present disclosure (when the flow control switch is in an open state and the knob body is moved upward to a topmost position), and FIG. 15 is a schematic assembled view of the flow control switch in a second state according to the first embodiment of the present disclosure (when the flow control switch is in the second closed state and the knob body is moved upward to a topmost position). When the knob body 40 is configured to drive the position-limiting element 41 to move upward to leave one of the first position-limiting groove 301 (as shown in FIG. 5 to FIG. 7), the second position-limiting groove 302 (as shown in FIG. 8 to FIG. 10) and the third position-limiting groove 303 (as shown in FIG.

15), the knob body 40 is moved upward to a topmost position, so that the matching protrusion 200 of the rotatable element 20 is accommodated in the matching opening 400 of the knob body 40 (as shown in FIG. 5, FIG. 8 and FIG. 15).

More particularly, referring to FIG. 2 to FIG. 4, and FIG. 14, when the position-limiting element 41 is driven to be partially accommodated in the first position-limiting groove 301 (as shown in FIG. 2 to FIG. 4) or the third position-limiting groove 303 (as shown in FIG. 14) by the knob body 40, a through hole of the ball body 11 does not communicate with a channel of the tubular body 10, so that the flow control switch S is in a closed state (as shown in FIG. 2 and FIG. 14).

More particularly, referring to FIG. 11 to FIG. 13, when the position-limiting element 41 is driven to be partially accommodated in the second position-limiting groove 302 by the knob body 40, the through hole of the ball body 11 communicates with the channel of the tubular body 10, so that the flow control switch S is in an opened state.

Therefore, when the knob structure 4 of the flow control switch S is touched or hit by an unexpected force, the flow control switch S can be used to limit the rotation of the rotatable member 20 relative to the position-limiting structure 3 through the position-limiting groove (such as the first position-limiting groove 301, the second position-limiting groove 302 or the third position-limiting groove 303), so as to avoid the gas or liquid supply in the system pipeline being forced to stop, and prevent unnecessary damage or impact on the back-end equipment or instruments.

Second Embodiment

Figure 16:
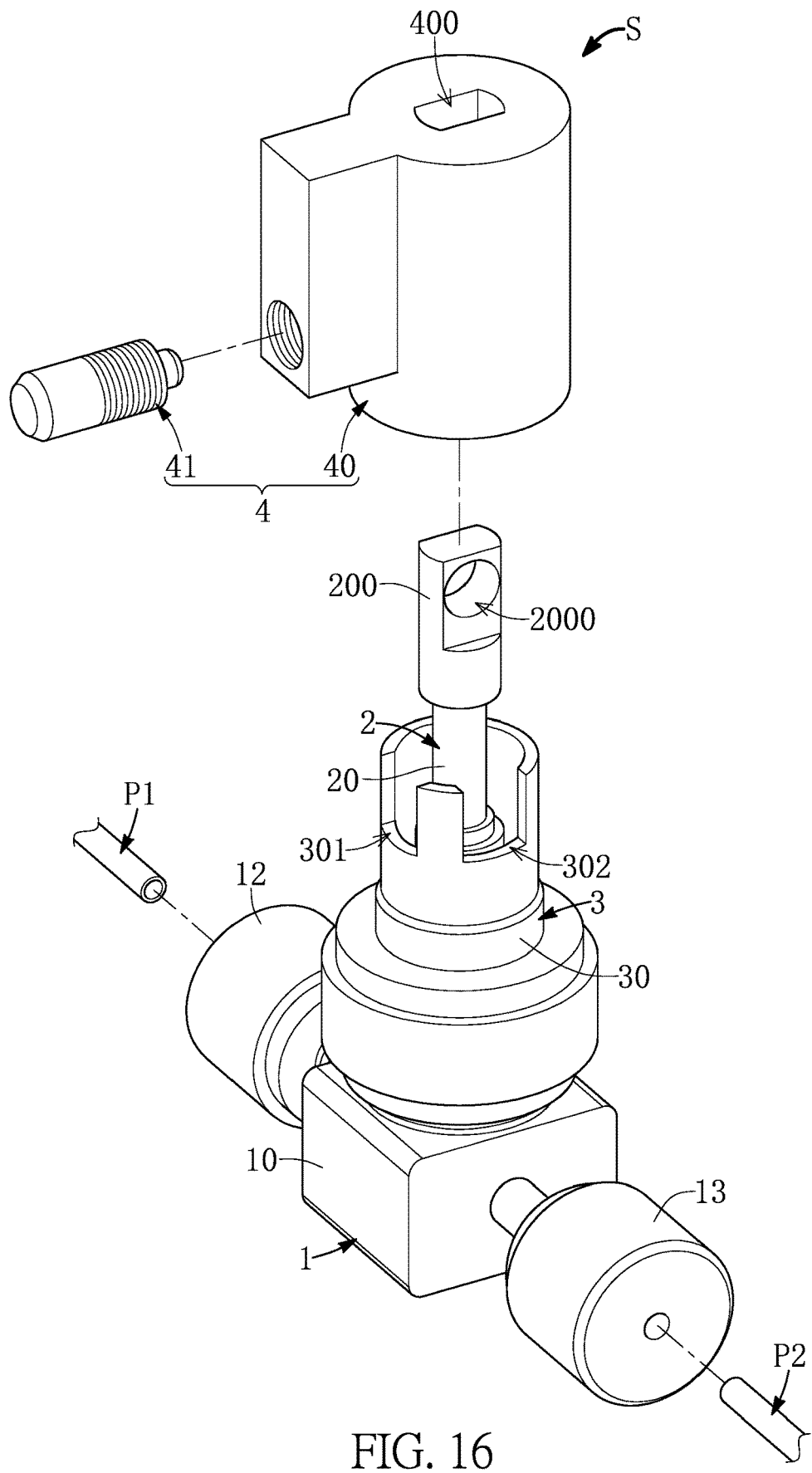
FIG. 16 is a schematic exploded view of the flow control switch according to a second embodiment of the present disclosure.

Referring to FIG. 16, a second embodiment of the present disclosure provides a flow control switch S (or a flow control device), which includes a pipeline structure 1, a rotating structure 2, a position-limiting structure 3 and a knob structure 4. Comparing FIG. 16 with FIG. 1, the main difference between the second embodiment and the first embodiment is as follows: in the second embodiment, the position-limiting structure 3 has a first position-limiting groove 301, and a second position-limiting groove 302 adjacent to the first position-limiting groove 301 (the third position-limiting groove 303 shown in FIG. 1 is omitted), and the first position-limiting groove 301 and the second position-limiting groove 302 downward extend from a top side of the surrounding body and are perpendicular to the tubular body 10. Moreover, the position-limiting element 41 of the knob structure 4 can be optionally disposed in one of the first position-limiting groove 301 and the second position-limiting groove 302, so as to limit a rotation of the rotatable element 20 relative to the position-limiting structure 3.

Therefore, what is identical in the second embodiment to the first embodiment is: when the knob body 40 is configured to drive the position-limiting element 41 to move downward to enter one of the first position-limiting groove 301 and the second position-limiting groove 302, the knob body 40 is moved downward to a bottommost position, so that the matching protrusion 200 of the rotatable element 20 is exposed outside the matching opening 400 of the knob body 40 (as shown in FIG. 2 to FIG. 4, and FIG. 11 to FIG. 13). Moreover, when the knob body 40 is configured to drive the position-limiting element 41 to move upward to leave one of the first position-limiting groove 301 and the second position-limiting groove 302, the knob body 40 is moved upward to a topmost position, so that the matching protrusion 200 of the rotatable element 20 is accommodated in the matching opening 400 of the knob body 40 (as shown in FIG. 5 to FIG. 7, and FIG. 8 to FIG. 10). Furthermore, when the position-limiting element 41 is driven to be partially accommodated in the first position-limiting groove 301 by the knob body 40, a through hole of the ball body 11 does not communicate with a channel of the tubular body 10, so that the flow control switch S is in a closed state (as shown in FIG. 2 to FIG. 4). In addition, when the position-limiting element 41 is driven to be partially accommodated in the second position-limiting groove 302 by the knob body 40, the through hole of the ball body 11 communicates with the channel of the tubular body 10, so that the flow control switch S is in an opened state (as shown in FIG. 11 to FIG. 13).

Beneficial Effects of the Embodiments

In conclusion, in the flow control switch S provided by the present disclosure, by virtue of "the position-limiting structure 3 being disposed on the tubular body 10 to surround the rotatable element 20," "the position-limiting structure 3 having a first position-limiting groove 301, a second position-limiting groove 302 adjacent to the first position-limiting groove 301, and a third position-limiting groove 303 adjacent to the second position-limiting groove 302 and corresponding to the first position-limiting groove 301" and "the position-limiting element 41 of the knob structure 4 being optionally disposed in one of the first position-limiting groove 301, the second position-limiting groove 302 and the third position-limiting groove 303," a rotation of the rotatable element 20 can be limited relative to the position-limiting structure 3.

Furthermore, in the flow control switch S provided by the present disclosure, by virtue of "the position-limiting structure 3 being disposed on the tubular body 10 to surround the rotatable element 20," "the position-limiting structure 3 having a first position-limiting groove 301 and a second position-limiting groove 302 adjacent to the first position-limiting groove 301" and "the position-limiting element 41 of the knob structure 4 being optionally disposed in one of the first position-limiting groove 301 and the second position-limiting groove 302," a rotation of the rotatable element 20 can be limited relative to the position-limiting structure 3.

Therefore, when the knob structure 4 of the flow control switch S is touched or hit by an unexpected force, the flow control switch S can be used to limit the rotation of the rotatable member 20 relative to the position-limiting structure 3 through the position-limiting groove (such as the first position-limiting groove 301, the second position-limiting groove 302 or the third position-limiting groove 303), so as to avoid the gas or liquid supply in the system pipeline being forced to stop, and prevent unnecessary damage or impact on the back-end equipment or instruments.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A flow control switch, comprising:
   a pipeline structure including a tubular body and a ball body rotatably disposed in the tubular body;
   a rotating structure including a rotatable element connected to the ball body for driving the ball body to rotate relative to the tubular body;
   a position-limiting structure disposed on the tubular body to surround the rotatable element; and
   a knob structure liftably disposed on the rotating structure for cooperating with the rotatable element;
   wherein the position-limiting structure has a first position-limiting groove, a second position-limiting groove adjacent to the first position-limiting groove, and a third position-limiting groove adjacent to the second position-limiting groove and corresponding to the first position-limiting groove;
   wherein the knob structure includes a knob body liftably disposed on the rotatable element and a position-limiting element detachably disposed on the knob body, and the position-limiting element of the knob structure is optionally disposed in one of the first position-limiting groove, the second position-limiting groove and the third position-limiting groove, so as to limit a rotation of the rotatable element relative to the position-limiting structure.

2. The flow control switch according to claim 1,
   wherein the pipeline structure includes an inlet pipeline matching element disposed at an end of the tubular body and an outlet pipeline matching element disposed at another end of the tubular body, the inlet pipeline matching element is configured to connect to an inlet pipeline, and the outlet pipeline matching element is configured to connect to an outlet pipeline;
   wherein the rotatable element has a first rotatable portion connected to the ball body, a second rotatable portion cooperating with the knob body, and a third rotatable portion connected between the first rotatable portion and the second rotatable portion, the rotatable element has a surrounding space disposed around the third rotatable portion and between the first rotatable portion and the second rotatable portion, and the knob body is configured to drive the position-limiting element to move in the surrounding space of the rotatable element;
   wherein the rotatable element of the rotating structure has a vertical axis line in an extending direction of the rotatable element, a first angle between a first direction from a middle position of the first position-limiting groove toward the vertical axis line and a second direction from a middle position of the second position-limiting groove toward the vertical axis line is 90 degrees, a second angle between the second direction from the middle position of the second position-limiting groove toward the vertical axis line and a third direction from a middle position of the third position-limiting groove toward the vertical axis line is 90 degrees, and a third angle between the first direction from the middle position of the first position-limiting groove toward the vertical axis line and the third direction from the middle position of the third position-limiting groove toward the vertical axis line is 180 degrees;
   wherein the position-limiting structure includes a surrounding body detachably disposed on the tubular body to surround the rotatable element, and the first position-limiting groove, the second position-limiting groove and the third position-limiting groove downward extend from a top side of the surrounding body and are perpendicular to the tubular body;
   wherein the knob body has a matching opening formed on a top side thereof, and the rotatable element has a matching protrusion disposed on a top side thereof for cooperating with the matching opening of the knob body.

3. The flow control switch according to claim 1,
   wherein the knob body has a matching opening formed on a top side thereof, and the rotatable element has a matching protrusion disposed on a top side thereof for cooperating with the matching opening of the knob body;
   wherein, when the knob body is configured to drive the position-limiting element to move downward to enter one of the first position-limiting groove, the second position-limiting groove and the third position-limiting groove, the knob body is moved downward to a bottommost position, so that the matching protrusion of the rotatable element is exposed outside the matching opening of the knob body;
   wherein, when the knob body is configured to drive the position-limiting element to move upward to leave one of the first position-limiting groove, the second position-limiting groove and the third position-limiting groove, the knob body is moved upward to a topmost position, so that the matching protrusion of the rotatable element is accommodated in the matching opening of the knob body;
   wherein, when the position-limiting element is driven to be partially accommodated in the first position-limiting groove or the third position-limiting groove by the knob body, a through hole of the ball body does not communicate with a channel of the tubular body, so that the flow control switch is in a closed state;
   wherein, when the position-limiting element is driven to be partially accommodated in the second position-limiting groove by the knob body, the through hole of the ball body communicates with the channel of the tubular body, so that the flow control switch is in an opened state.

4. The flow control switch according to claim 1,
   wherein the rotatable element of the rotating structure has a vertical axis line in an extending direction of the rotatable element, and the tubular body of the pipeline structure has a horizontal axis line in an extending direction of the tubular body;
   wherein a first angle between a first direction from a middle position of the first position-limiting groove toward the vertical axis line and a second direction from a middle position of the second position-limiting groove toward the vertical axis line is 90 degrees;
   wherein a second angle between the second direction from the middle position of the second position-limiting groove toward the vertical axis line and a third direction from a middle position of the third position-limiting groove toward the vertical axis line is 90 degrees;
   wherein a third angle between the first direction from the middle position of the first position-limiting groove toward the vertical axis line and the third direction from the middle position of the third position-limiting groove toward the vertical axis line is 180 degrees;

wherein the second direction from the middle position of the second position-limiting groove toward the vertical axis line is parallel to the horizontal axis line of the tubular body.

5. The flow control switch according to claim 1, wherein the position-limiting structure includes a surrounding body detachably disposed on the tubular body to surround the rotatable element, and the first position-limiting groove, the second position-limiting groove and the third position-limiting groove downward extend from a top side of the surrounding body and are perpendicular to the tubular body.

6. A flow control switch, comprising:
a pipeline structure including a tubular body and a ball body rotatably disposed in the tubular body;
a rotating structure including a rotatable element connected to the ball body for driving the ball body to rotate relative to the tubular body;
a position-limiting structure disposed on the tubular body to surround the rotatable element; and
a knob structure liftably disposed on the rotating structure for cooperating with the rotatable element;
wherein the position-limiting structure has a first position-limiting groove, and a second position-limiting groove adjacent to the first position-limiting groove;
wherein the knob structure includes a knob body liftably disposed on the rotatable element and a position-limiting element detachably disposed on the knob body, and the position-limiting element of the knob structure is optionally disposed in one of the first position-limiting groove and the second position-limiting groove, so as to limit a rotation of the rotatable element relative to the position-limiting structure.

7. The flow control switch according to claim 6,
wherein the pipeline structure includes an inlet pipeline matching element disposed at an end of the tubular body and an outlet pipeline matching element disposed at another end of the tubular body, the inlet pipeline matching element is configured to connect to an inlet pipeline, and the outlet pipeline matching element is configured to connect to an outlet pipeline;
wherein the rotatable element has a first rotatable portion connected to the ball body, a second rotatable portion cooperating with the knob body, and a third rotatable portion connected between the first rotatable portion and the second rotatable portion, the rotatable element has a surrounding space disposed around the third rotatable portion and between the first rotatable portion and the second rotatable portion, and the knob body is configured to drive the position-limiting element to move in the surrounding space of the rotatable element;
wherein the rotatable element of the rotating structure has a vertical axis line in an extending direction of the rotatable element, and a first angle between a first direction from a middle position of the first position-limiting groove toward the vertical axis line and a second direction from a middle position of the second position-limiting groove toward the vertical axis line is 90 degrees;
wherein the position-limiting structure includes a surrounding body detachably disposed on the tubular body to surround the rotatable element, and the first position-limiting groove and the second position-limiting groove downward extend from a top side of the surrounding body and are perpendicular to the tubular body;
wherein the knob body has a matching opening formed on a top side thereof, and the rotatable element has a matching protrusion disposed on a top side thereof for cooperating with the matching opening of the knob body.

8. The flow control switch according to claim 6,
wherein the knob body has a matching opening formed on a top side thereof, and the rotatable element has a matching protrusion disposed on a top side thereof for cooperating with the matching opening of the knob body;
wherein, when the knob body is configured to drive the position-limiting element to move downward to enter one of the first position-limiting groove and the second position-limiting groove, the knob body is moved downward to a bottommost position, so that the matching protrusion of the rotatable element is exposed outside the matching opening of the knob body;
wherein, when the knob body is configured to drive the position-limiting element to move upward to leave one of the first position-limiting groove and the second position-limiting groove, the knob body is moved upward to a topmost position, so that the matching protrusion of the rotatable element is accommodated in the matching opening of the knob body;
wherein, when the position-limiting element is driven to be partially accommodated in the first position-limiting groove by the knob body, a through hole of the ball body does not communicate with a channel of the tubular body, so that the flow control switch is in a closed state;
wherein, when the position-limiting element is driven to be partially accommodated in the second position-limiting groove by the knob body, the through hole of the ball body communicates with the channel of the tubular body, so that the flow control switch is in an opened state.

9. The flow control switch according to claim 6,
wherein the rotatable element of the rotating structure has a vertical axis line in an extending direction of the rotatable element, and the tubular body of the pipeline structure has a horizontal axis line in an extending direction of the tubular body;
wherein a first angle between a first direction from a middle position of the first position-limiting groove toward the vertical axis line and a second direction from a middle position of the second position-limiting groove toward the vertical axis line is 90 degrees;
wherein the second direction from the middle position of the second position-limiting groove toward the vertical axis line is parallel to the horizontal axis line of the tubular body.

10. The flow control switch according to claim 6, wherein the position-limiting structure includes a surrounding body detachably disposed on the tubular body to surround the rotatable element, and the first position-limiting groove and the second position-limiting groove downward extend from a top side of the surrounding body and are perpendicular to the tubular body.

* * * * *